(12) United States Patent
Poelling et al.

(10) Patent No.: US 11,832,554 B2
(45) Date of Patent: Dec. 5, 2023

(54) TILTING MECHANISM FOR UNIFORM DISTRIBUTION OF A MATERIAL ON A CONVEYING AND CLEANING UNIT

(71) Applicant: CLAAS Selbstfahrende Erntemaschinen GmbH, Harsewinkel (DE)

(72) Inventors: Benedikt Poelling, Coesfeld (DE); Dennis Lutterbeck, Telgte (DE); George Danatzis, Harsewinkel (DE); Norbert Strieker, Verl (DE); Michael Kuehn, Beelen (DE)

(73) Assignee: CLAAS SELBSTFAHRENDE ERNTEMASCHINEN GMBH, Harsewinkel (DE)

( * ) Notice: Subject to any disclaimer, the term of this patent is extended or adjusted under 35 U.S.C. 154(b) by 653 days.

(21) Appl. No.: 17/026,433

(22) Filed: Sep. 21, 2020

(65) Prior Publication Data

US 2021/0084817 A1 Mar. 25, 2021

(30) Foreign Application Priority Data

Sep. 23, 2019 (DE) .......................... 102019125489.2

(51) Int. Cl.
*A01D 41/127* (2006.01)
*A01D 61/00* (2006.01)
(Continued)

(52) U.S. Cl.
CPC ....... *A01D 41/1276* (2013.01); *A01D 61/008* (2013.01); *A01D 75/282* (2013.01); *A01D 41/06* (2013.01)

(58) Field of Classification Search
CPC .............. A01D 41/1276; A01D 61/008; A01D 75/282; A01D 41/06; A01F 12/448; A01F 12/58
See application file for complete search history.

(56) References Cited

U.S. PATENT DOCUMENTS 2,351,567 A * 6/1944 Welty ...................... A01F 12/00
460/93
3,497,229 A * 2/1970 Sietmann ............. A01D 75/282
198/665
(Continued)

FOREIGN PATENT DOCUMENTS

DE 3332763 A1 3/1985
DE 102009000797 A1 8/2010
(Continued)

OTHER PUBLICATIONS

European Search Report dated Jan. 12, 2021 issued in European Application No. 20 18 3653 (with English translation of the relevant parts).

*Primary Examiner* — Arpad F Kovacs
(74) *Attorney, Agent, or Firm* — Collard & Roe, P.C.

(57) ABSTRACT

A self-propelled combine harvester has at least one tilting mechanism for the uniform distribution of a harvested material on an oscillating conveying and cleaning unit, in particular a top sieve. The tilting mechanism has elements for defining a swiveling direction of the conveying and cleaning unit which are arranged between the conveying and cleaning unit and a machine housing. The tilting mechanism has an actuator for continuous adjustment of at least one component part of the elements from an initial position to an adjusting position. The position of the at least one component part decisively defines the swiveling direction. An electric control unit controls the actuator depending on a state of the combine harvester and/or harvested material and the initial position of the at least one component part of the tilting mechanism.

15 Claims, 5 Drawing Sheets

(51) Int. Cl.
*A01D 75/28* (2006.01)
*A01D 41/06* (2006.01)

(56) References Cited

U.S. PATENT DOCUMENTS

| | | | | |
|---|---|---|---|---|
| 4,344,443 A * | 8/1982 | De Busscher | ....... | A01D 75/282 |
| | | | | 460/97 |
| 4,535,788 A * | 8/1985 | Rowland-Hill | ...... | A01D 75/282 |
| | | | | 56/DIG. 15 |
| 4,548,214 A * | 10/1985 | Sheehan | ............. | A01D 75/282 |
| | | | | 460/9 |
| 4,557,276 A * | 12/1985 | Hyman | ................ | A01D 75/282 |
| | | | | 209/416 |
| 4,598,718 A | 7/1986 | Glaubitz et al. | | |
| 4,736,753 A | 4/1988 | Glaubitz et al. | | |
| 6,582,298 B2 * | 6/2003 | Wolters | ............. | A01D 41/1243 |
| | | | | 460/103 |
| 6,672,957 B2 * | 1/2004 | Voss | ...................... | A01F 12/448 |
| | | | | 460/101 |
| 7,322,882 B2 | 1/2008 | Duquesne et al. | | |
| 7,927,199 B2 * | 4/2011 | Adamson | ............. | A01F 12/448 |
| | | | | 460/101 |
| 8,939,829 B2 * | 1/2015 | Murray | ................ | A01F 12/448 |
| | | | | 460/101 |
| 8,951,105 B2 * | 2/2015 | Murray | ................ | A01F 12/448 |
| | | | | 460/101 |
| 9,693,506 B2 * | 7/2017 | De Smet | ................ | A01F 12/448 |
| 10,076,078 B2 * | 9/2018 | Hillen | .................. | A01D 75/282 |
| 10,080,329 B2 * | 9/2018 | Reinecke | ............... | A01F 12/448 |
| 10,080,330 B2 * | 9/2018 | Reinecke | ........... | A01D 41/1276 |
| 10,104,839 B2 * | 10/2018 | Nelson | .................. | A01F 12/446 |
| 10,334,781 B2 * | 7/2019 | Reinecke | ........... | A01D 41/1276 |
| 10,398,085 B2 * | 9/2019 | Duquesne | ............. | A01F 12/446 |
| 10,568,267 B2 * | 2/2020 | Narayanan | ............... | A01F 12/32 |
| 10,721,869 B2 * | 7/2020 | Duquesne | ............. | A01F 12/446 |
| 2005/0282601 A1 * | 12/2005 | Duquesne | ............ | A01D 75/282 |
| | | | | 460/101 |
| 2013/0165191 A1 * | 6/2013 | Farley | .................. | A01D 75/282 |
| | | | | 460/80 |
| 2013/0172057 A1 * | 7/2013 | Farley | .................. | A01D 75/282 |
| | | | | 460/5 |
| 2015/0080070 A1 * | 3/2015 | Johnson | ............. | A01D 41/1273 |
| | | | | 460/5 |
| 2015/0296712 A1 * | 10/2015 | Duquesne | ............. | A01F 12/448 |
| | | | | 460/149 |
| 2017/0049057 A1 | 2/2017 | Reinecke et al. | | |
| 2019/0357441 A1 * | 11/2019 | Hillen | ................. | A01F 12/448 |

FOREIGN PATENT DOCUMENTS

| | | | | | |
|---|---|---|---|---|---|
| EP | | 0548411 A1 * | 6/1993 | ........... | A01D 75/282 |
| EP | | 1609352 A1 | 12/2005 | | |
| EP | | 3498078 A1 * | 6/2019 | ........... | A01D 75/282 |

* cited by examiner

TILTING MECHANISM FOR UNIFORM DISTRIBUTION OF A MATERIAL ON A CONVEYING AND CLEANING UNIT

CROSS-REFERENCE TO RELATED APPLICATIONS

This application claims priority under 35 USC 119 of German Application No. DE 10 2019 125 489.2, filed on Sep. 23, 2019, the disclosure of which is herein incorporated by reference.

BACKGROUND OF THE INVENTION

The present invention is directed to a self-propelled combine harvester with a tilting mechanism for the uniform distribution of a material on an oscillating conveying and cleaning unit, in particular a top sieve, during lateral tilting of the combine harvester.

In self-propelled combine harvesters, there is the problem that the harvested material loads one side of the conveying and cleaning units when threshing on slopes because the harvested material slides to one side of the conveying and cleaning unit when the machine tilts to the side. This minimizes the cleaning effect due to the accumulation of harvested material in clumps on one side.

A device for solving this problem is known from DE 33 32 763 in which the swiveling direction of the top sieve and, accordingly, also the conveying direction of the harvested material changes depending on the tilt position of a combine harvester when threshing on side slopes in order to achieve a uniform distribution of the harvested material on the top sieve. To this end, the top sieve is acted upon by holders which project outward through slots in the side wall of the combine harvester and are rotatably fastened to supporting pieces. The supporting pieces are fixedly connected to swiveling levers. The swiveling levers in turn are swivelably mounted at the side wall of the combine harvester by brackets. Further, a coupling rod which is fixedly connected to a receptacle acts on a swiveling lever. The receptacle is movably held by the side wall of the combine harvester in its upper area via a supporting arm and, on the other hand, is tilted by a piston-cylinder unit acting on the side wall of the combine harvester. The piston-cylinder unit is impinged by pressure oil via a control valve which is fixedly connected to the receptacle and which can be actuated by the pendulum suspended in the receptacle. When the combine harvester is tilted on the slope, the receptacle is also tilted. However, since the pendulum is always positioned perpendicularly, the position of the receptacle changes relative to the pendulum so that the pendulum activates the control valve and the piston-cylinder unit is impinged by pressure oil. The receptacle is tilted when the piston rod extends or retracts so that the angular position of the swivel levers and, therefore, also the swiveling direction of the top sieve, particularly the magnitude of the lateral movement component, is changed via the coupling rod.

SUMMARY OF THE INVENTION

The invention is based on the problem that the device with the receptacle and with the piston-cylinder unit which is connected to the receptacle and to the side wall of the combine harvester occupies a large amount of space. Further, the mechanical construction is cost-intensive and the mechanical activation of the control valve via the pendulum limits the dependence of the swiveling direction of the top sieve to the inclined position of the combine harvester. It is likewise disadvantageous that mounting or retrofitting the device is highly time-consuming owing to the many components which must be arranged on the combine harvester. The above-stated problems are solved in a combine harvester with at least one tilting mechanism for the uniform distribution of a harvested material on an oscillating conveying and cleaning unit, in particular a top sieve, wherein the tilting mechanism comprises elements for defining a swiveling direction of the conveying and cleaning unit which are arranged between the conveying and cleaning unit and a machine housing. The tilting mechanism comprises an actuator for continuous adjustment of at least one component part of the elements from an initial position to an adjusting position, wherein the position of the at least one component part decisively defines the swiveling direction According to the invention, an electric control unit is provided which directly or indirectly controls the actuator depending on at least one state of the combine harvester and/or harvested material and depending on the initial position of the at least one component part of the tilting mechanism. Compared to a mechanical control of the actuator, the electric control unit is less costly and requires appreciably less installation space. Further, a large number of characteristic curves can be stored in the electric control unit which, in addition to a lateral inclination of the combine harvester, take into account further states for controlling the actuator with the aim of achieving a more uniform distribution on the conveying and cleaning unit. Such states can be, for example, the longitudinal inclination of the combine harvester, the moisture of the harvested material, the type of crop of which the harvested material is composed, or the signals of a throughput monitoring device.

In an advantageous configuration, the initial position corresponds to an actual position of the at least one component part, and the adjusting position corresponds to a target position of the at least one component part, the electric control unit determines the adjusting position and directly or indirectly controls the actuator for moving the at least one component part into the adjusting position.

In particular, the at least one state of the combine harvester and/or harvested material can be the lateral inclination of the combine harvester because the lateral inclination of the combine harvester can lead to an accumulation of harvested material on one side of the conveying and cleaning unit resulting in an impaired cleaning effect of the conveying and cleaning unit.

In an advantageous configuration, the conveying and cleaning unit is tiltably suspended in the machine housing by means of swiveling elements. The swiveling elements allow an oscillating support of the conveying and cleaning unit so that the latter can be set in oscillating motion, for example, via a crank.

In particular, the elements of the tilting mechanism can comprise at least one holder, a swiveling rod, a swiveling fork and a holding device. The holder is arranged in a stationary manner at one end laterally at the conveying and cleaning unit and projects out through slots lateral to the machine housing, the holder being rotatably connected by its free end to one end of the swiveling rod, and the swiveling rod is rotatably arranged at the at least one component part which is the swiveling fork. The swiveling fork is arranged at the machine housing by means of a holding device so as to be tiltable around a swiveling axis. This construction allows a change in the swiveling direction, particularly the magnitude of a lateral movement component, of the conveying and cleaning unit depending on the position of the swiveling fork. It is further achieved by the construction that the means required for changing the swiveling direction are arranged outside of the machine housing so that less installation space is wasted inside of the machine housing. The arrangement of the components at a holding device makes it possible to provide a preassembled component group by means of which the tilting mechanism can be fitted to or retrofitted to the machine housing quickly and simply. For this purpose, it can be provided to arrange further components, for example, sensors and/or actuators, at the holding device.

In an advantageous configuration, the actuator can be arranged at least approximately parallel to the at least one component part. In this way, the required installation space is further reduced and a more compact arrangement of the components is achieved. The more compact arrangement offers the advantage of more installation space for other component parts of the combine harvester such as the tires, for example.

The actuator can preferably be formed as a piston-cylinder unit in order to make it possible for the swiveling fork to tilt around the swiveling axis in a simple manner.

In a preferred embodiment, a cylinder of the piston-cylinder unit which usually comprises a cylinder and a piston rod can be rotatably movably connected to the swiveling fork on the side facing the piston rod by means of a fastening element, and the piston rod of the piston-cylinder unit is rotatably movably connected to the holding device. The above-mentioned approximately parallel arrangement of the actuator with respect to the swiveling fork is made possible in this way. In particular, the rotatably movable connection of the fastening element to the cylinder on the side of the cylinder facing the piston rod results in an expanded tilting range of the swiveling fork.

An advantageous further development provides that a position sensor is arranged between the machine housing and the at least one component part, preferably the swiveling fork, in such a way that this position sensor acquires a measurement signal for determining the position of the at least one component part relative to the machine housing, particularly an angle between the machine housing and the at least one component part around the swiveling axis. The position of the at least one component part relative to the machine housing is required for the direct or indirect control of the actuator.

It is further provided that the combine harvester has a tilt sensor which detects the lateral inclination of the combine harvester, since the lateral inclination may be required as state for the direct or indirect control of the actuator.

In an advantageous configuration, the tilting mechanism can have a neutral position, and at least a first position element, preferably a stop, can be provided at the holding device, which first position element has a surface for defining a plane and, in the neutral position of the tilting mechanism, the plane is tangent to a defined second position element, preferably a pin, which is arranged on the at least one component part, preferably the swiveling fork. The underlying purpose of the first position element and second position element is a simple alignment of the tilting mechanism in the neutral position. In this advantageous configuration, only one object with a plane surface, for example, a straightedge, is required for this purpose. The neutral position of the tilting mechanism is located in a position of the tilting mechanism in which the object has planar contact with the surface of the first position element and is simultaneously tangent to the second position element. A possible alternative is an arrangement in which the first position element is arranged on the at least one component part and the second position element is arranged on the holding device or a component element which is fastened in a stationary manner to the frame structure of the combine harvester relative to the at least one component part.

It is advantageous when the tilting mechanism is formed in such a way that the influence of the tilting mechanism on the swiveling direction of the conveying and cleaning unit is at a minimum in the neutral position of the tilting mechanism. The neutral position is provided for a harvesting process on level ground in which the oscillating movement of the cleaning and conveying unit is sufficient in an unaltered state for a uniform distribution of the harvested material.

In a further configuration of the invention, the actuator is constructed as a hydraulic piston-cylinder unit, and the hydraulic piston-cylinder unit is impinged by pressure oil via a control valve which is controlled by the electric control unit. The use of a hydraulic piston-cylinder unit is advantageous in that it can be connected to an existing hydraulic system in the combine harvester. Further, hydraulic piston-cylinder units can achieve high pulling and pushing forces.

In a further configuration of the invention, the hydraulic piston-cylinder unit can form a passage between a first hydraulic line and a second hydraulic line in at least one end position. A movement of the hydraulic piston-cylinder unit into such an end position can serve to facilitate deaeration because in a corresponding arrangement with pressure oil flowing through the hydraulic piston-cylinder unit, any air that is present is discharged from the hydraulic piston-cylinder unit. For example, a process of this kind could be initiated automatically at defined time intervals or by means of manual activation. An automatic deaeration process of this kind results in reduced expenditure of time for maintenance tasks and makes it easier to put the tilting mechanism into operation.

In a further configuration of the invention, the actuator can be constructed as an electric adjusting device, particularly as an electric lifting cylinder. This facilitates the installation of the actuator because an electric adjusting device merely requires easily routable power lines. Further, the need for a control valve is eliminated so that the actuator can be controlled directly by the electric control unit.

BRIEF DESCRIPTION OF THE DRAWINGS

Further advantageous configurations are the subject matter of further subclaims and are described in the following referring to an embodiment example depicted in a number of figures. In the drawings:

DETAILED DESCRIPTION OF THE EMBODIMENTS

Figure 1:
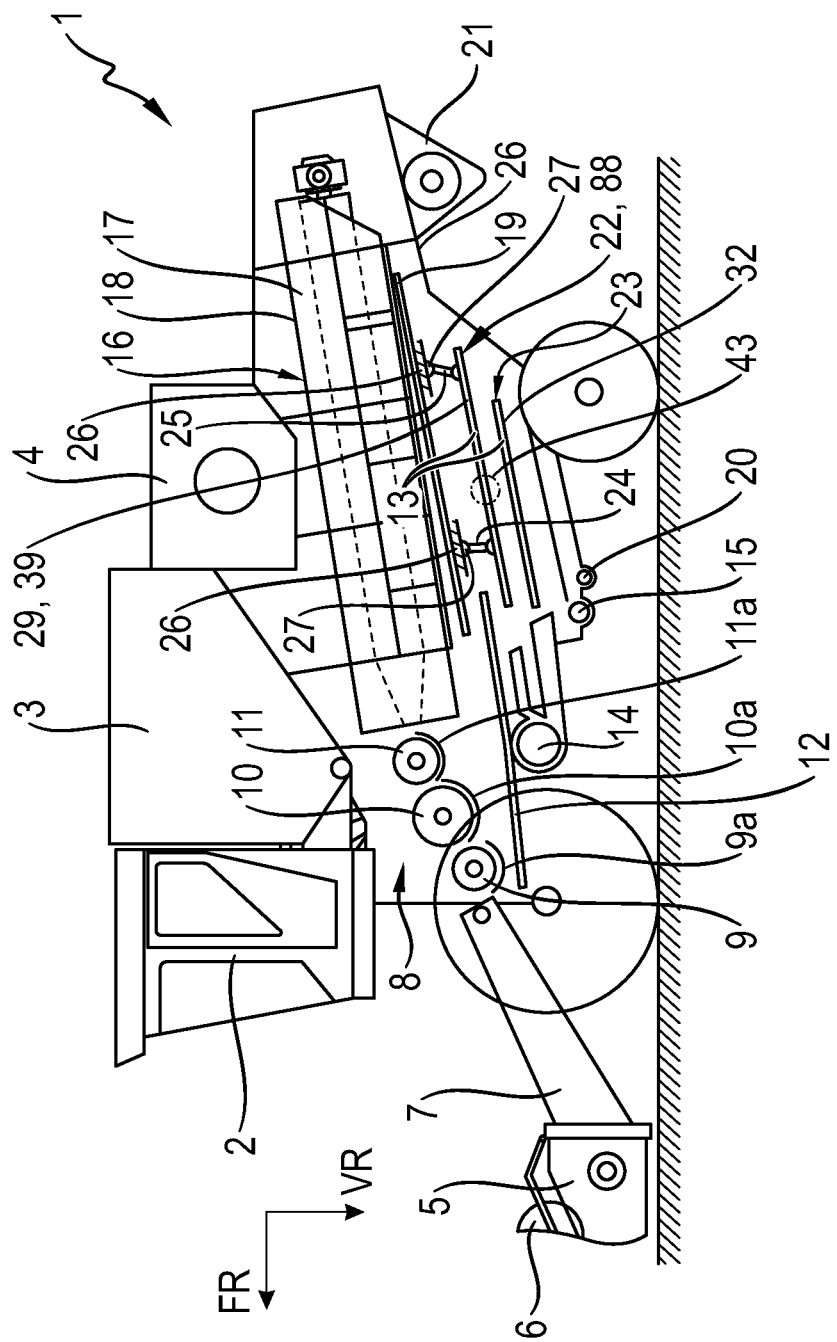
FIG. 1 shows a schematic side view of a self-propelled harvesting machine constructed as a combine harvester.

FIG. 1 shows a harvesting machine which is constructed as a self-propelled combine harvester 1 and which has a driver's cab 2, a grain tank 3 located behind the latter and an internal combustion engine 4 following the grain tank 3. Further, the self-propelled combine harvester 1 receives a header 5 in its front area. The header 5 collects the harvested stalks (not shown) with a reel 6 and cuts them close to the ground by means of a mowing device, not shown, whereupon the harvested material is fed from the header 5 by a feed conveyor 7 of a threshing and separating device 8. This threshing and separating device 8 is formed as a multiple-drum arrangement of a tangential threshing unit and comprises a pre-acceleration drum 9, a threshing drum 10 and a feed drum 11. Separating concaves 9a, 10a, and 11a are associated with these drums 9, 10 and 11. The threshed crop passes through the separating concaves 9a, 10a, and 11a to a preparation floor 12 via which it is fed to a cleaning device 13 with oscillating sieves which comprise a conveying and cleaning unit 13, which is to be described more fully and which is formed as a top sieve 22, and a bottom sieve 23. A cleaning fan 14 cooperates with the sieves of the cleaning device 13 and generates an airflow in the region of the sieves so that chaff and short straw are separated and transported out of the combine harvester 1. The cleaned harvested material passing through the sieves of the cleaning device 13 arrives in a transverse feed auger 15 which transfers the harvested material to a grain elevator, not shown, which is connected to the grain tank 3.

All of the parts of the harvested material which does not pass the separating concaves 9a, 10a and 11a in direction of the preparation floor 12 and which consists of straw, short straw, ears and possibly awns are fed to a device 16 for residual grain separation by means of the feed drum 11. In the combine harvester 1 shown in FIG. 1, this device 16 for separating residual grain has a separating rotor 17 which runs in longitudinal direction of the combine harvester 1. However, in an alternative construction, the combine harvester 1 can also be outfitted with straw walkers. Further, the separating rotor 17 is surrounded radially by a separating housing 18 which has separating openings, not shown in more detail, in its lower region and is closed, i.e., impassable, in the upper region. Residual grain, chaff, ears and possibly short straw arrive through the above-mentioned openings of the separating housing 18 on a return pan 19 which feeds these constituent parts to the cleaning device 13. The constituent parts of this flow of harvested material which are separated out by the sieves of the cleaning device 13 arrive in a conveyor screw 20 which feeds these constituent parts of the harvested material to a return which is known per se and therefore not shown in more detail. The return conveys these constituent parts of the harvested material back into the threshing and separating device 8. The straw conveyed through the separating rotor 17 exits the latter at the rear end thereof, where the straw arrives in a straw chopper 21.

Figure 2:
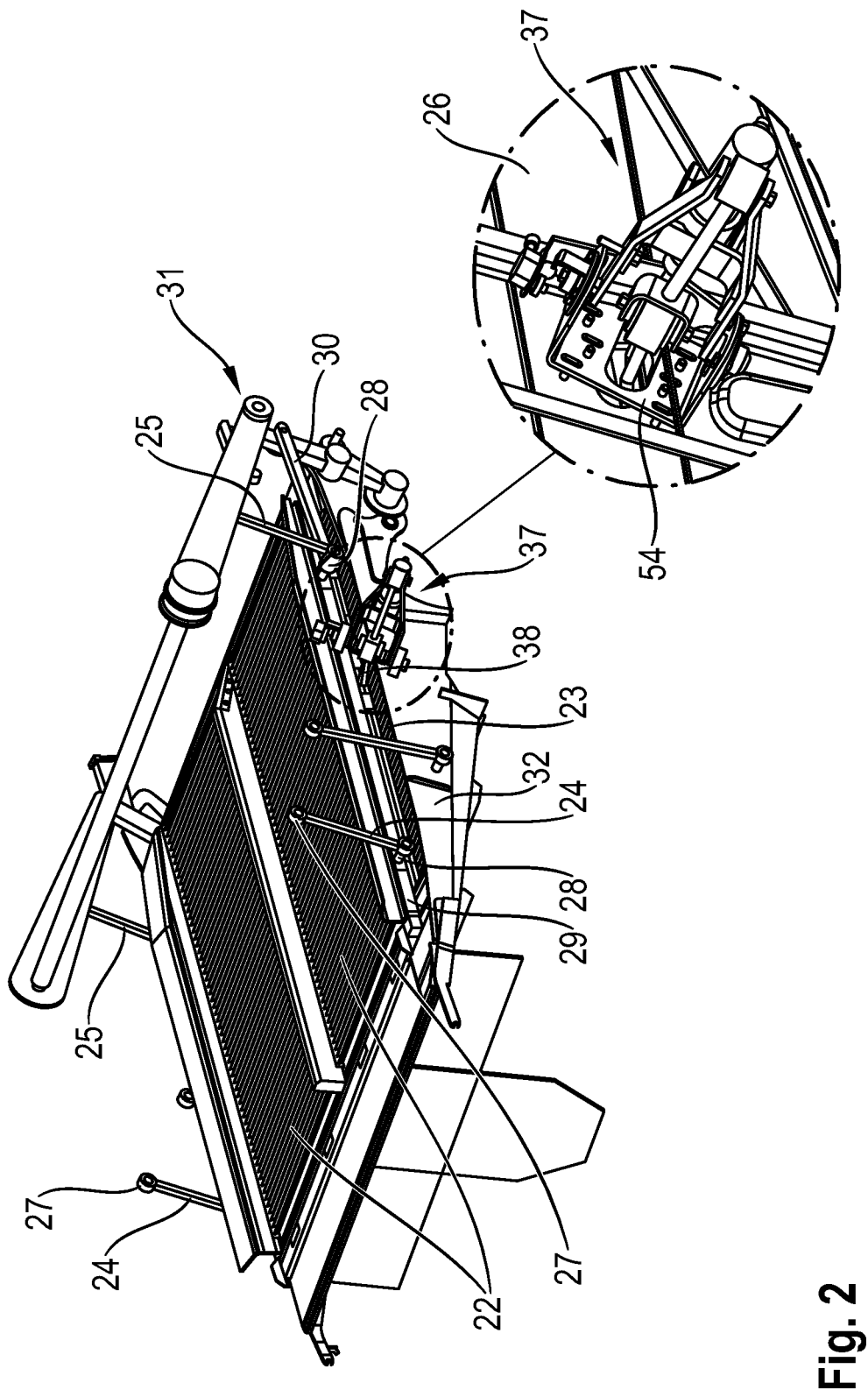
FIG. 2 shows a side view of the tilting mechanism which is arranged at a first sieve pan which holds the top sieve of a combine harvester, and a side view of a second sieve pan which holds the bottom sieve of a combine harvester, and a detail A which shows the tilting mechanism arranged with a holding device at the machine housing of the combine harvester.

FIG. 2 shows a first sieve pan 29 which holds the top sieve 22 and a second sieve pan 32 which holds the bottom sieve 23. The first sieve pan 29 is suspended at the front swiveling elements 24 and rear swiveling element 25 which are each freely swivelably supported by their upper ends, respectively, at holders 27 coupled to the machine housing 26 and are freely swivelably bearing-mounted at their lower ends at the first sieve pan 29 likewise by means of bearings 28. A connecting rod 30 connects the first sieve pan 29 to an eccentric drive 31 which is known per se and not described in more detail. The top sieve 22 is excited to oscillate by means of the eccentric drive 31. Further, FIG. 2 shows a tilting mechanism 37 according to the invention which will be described in more detail and which has a holder 38 fixedly connected to the first sieve pan 29. The detail A in FIG. 2 shows the tilting mechanism 37 and a section of the machine housing 26 at which the tilting mechanism 37 is arranged by means of a holding device 54.

Figure 3A:
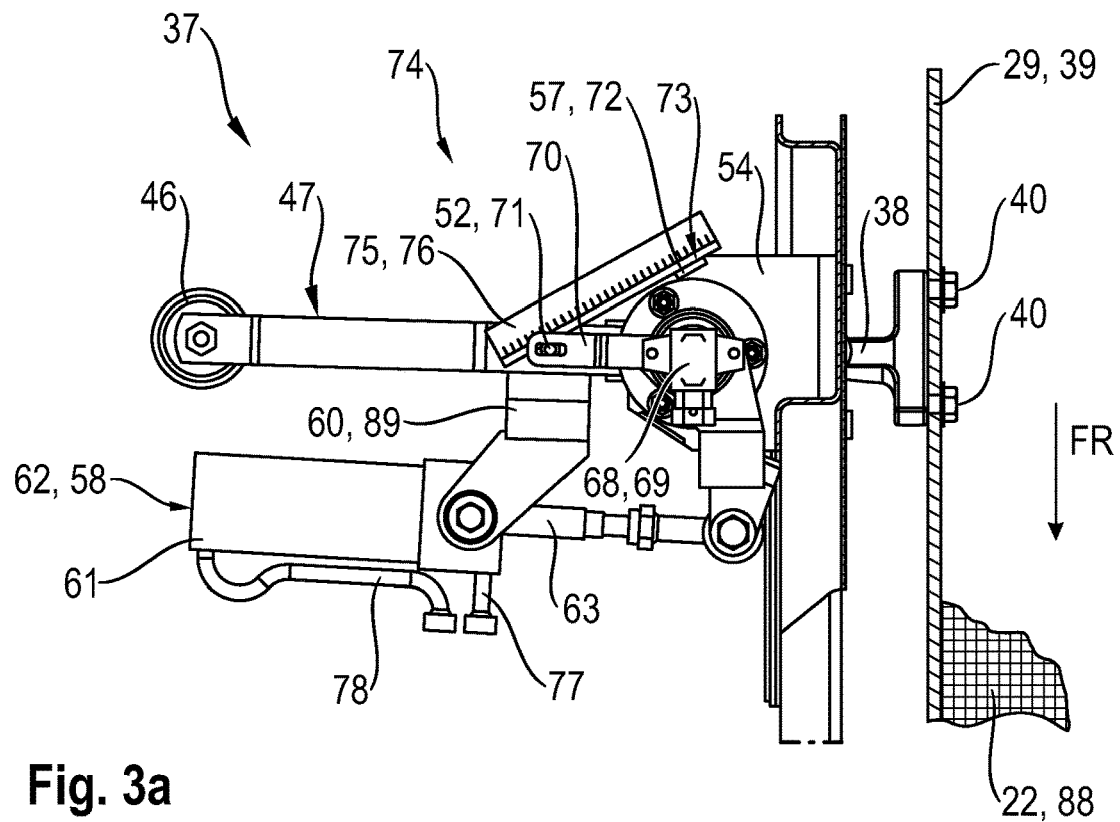
FIG. 3a shows a top view of a tilting mechanism for changing the swiveling direction.
Figure 3B:
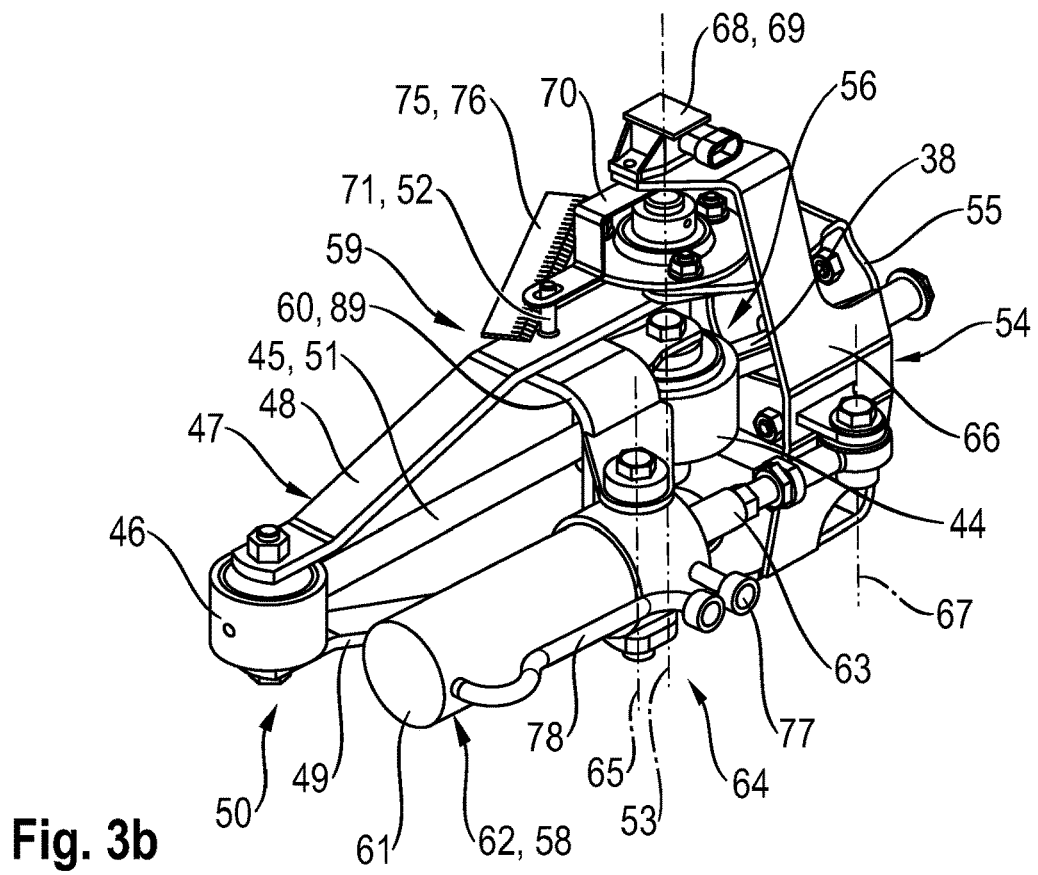
FIG. 3b shows a side view of the tilting mechanism.

FIG. 3a shows the tilting mechanism 37 according to the invention in a top view with a section of the top sieve 22 and a lateral section of the machine housing 26. FIG. 3b shows the tilting mechanism 37 in a side view. The holder 38 of the tilting mechanism is connected, e.g., by means of screws 40, at one end in a stationary manner to a longitudinal side 39 of the first sieve pan 29, which longitudinal side 39 extends substantially in driving direction FR. Bore holes 41 can be provided, preferably in a central region 42 of the longitudinal side 39 of the first sieve pan 29, for screwing the holder 39 to the first sieve pan 29. A first slot opening 43 through which the holder 38 projects outward is provided at the machine housing 26.

In the embodiment example, the holder 38 is rotatably movably arranged by means of a first metal-rubber bearing 44 by its free end at one end of a component part 51 which is formed as swiveling rod 45. The first metal-rubber bearing 44 allows a rotational movement of the holder 38 relative to the swiveling rod 45 with substantially three rotational degrees of freedom. The swiveling rod 45 is in turn rotatably movably arranged by the free end at a swiveling fork 47 by means of a second metal-rubbing bearing 46.

The swiveling fork 47 has a first profile element 48 and a second profile element 49 which are arranged in a substantially V-shaped manner with respect to one another. On the narrowing side 50, the swiveling rod 47 is bearing-mounted by means of the second metal-rubber bearing 46. At their free sides, the first profile element 48 and the second profile element 49 are arranged at the holding device 54 so as to be rotatably movable around a swiveling axis 53 extending substantially in a vertical direction VR.

The holding device 54 has a supporting side 55 with a second slot opening 56 located at the center thereof. The supporting side 55 is arranged in a stationary manner, for example, screwed, at the machine housing 26 such that the first slot opening 43 and the second slot opening 56 overlap.

A fastening element 89 which is formed as a U-shaped profile element 60 is arranged, for example, welded, in a stationary manner between the first profile element 48 and the second profile element 49 at the swiveling fork 47 in a central region 59 which is located substantially in the middle between the narrowing side 50 of the V-shaped swiveling fork 47 and the holding device 54. A cylinder 61 of an actuator 58 formed as a hydraulic-piston-cylinder unit 62 on the side 64 facing the piston rod 63 is supported at the U-shaped profile element 60 so as to be rotatably movable around an axis 65 extending parallel to the swiveling axis 53. The hydraulic-piston-cylinder unit 62 extends substantially parallel to the swiveling fork 47. The holding device 54 has a first element 66 which extends transverse to the supporting side 55. The piston rod 63 of the hydraulic piston-cylinder unit 62 is mounted at the first element 66 by its free end so as to be rotatably movable around a rotational axis 67 extending parallel to the swiveling axis 53.

Further, a position sensor 68 which is formed as an angular potentiometer 69 is arranged at the holding device 54. A measuring gauge 70 is associated with the angular potentiometer 69 so as to be rotatably movable around the swiveling axis 53 which contacts the swiveling fork 47 by means of a pin 71 fastened to the swiveling fork 47 so that it executes a rotational movement of the swiveling fork 47 around the swiveling axis 53. In the simplest case, the position sensor 68 is arranged at the swiveling axis 53 so that the measurement data of the position sensor 68 can be evaluated in a simple manner.

A first position element 57 which is formed as a stop 72 is arranged to be stationary at the holding device 54 and has a plane surface 73 extending parallel to the swiveling axis 53. Further, the plane surface 73 is formed in such a way that it defines a plane (not shown). In a neutral position 74 of the tilting mechanism 37 this plane is tangent to a second position element 52 formed as pin 71. This makes it possible to align the tilting mechanism 37 in the neutral position 74 in a simple manner. Only one object 75 with a plane surface, for example, a straightedge 76, is required for this purpose. In the neutral position 74, the object 75 contacts surface 73 in a planar manner by its plane surface and is tangent to the pin 71. The stop 72 can be formed integral with the holding device 54.

Figure 4:
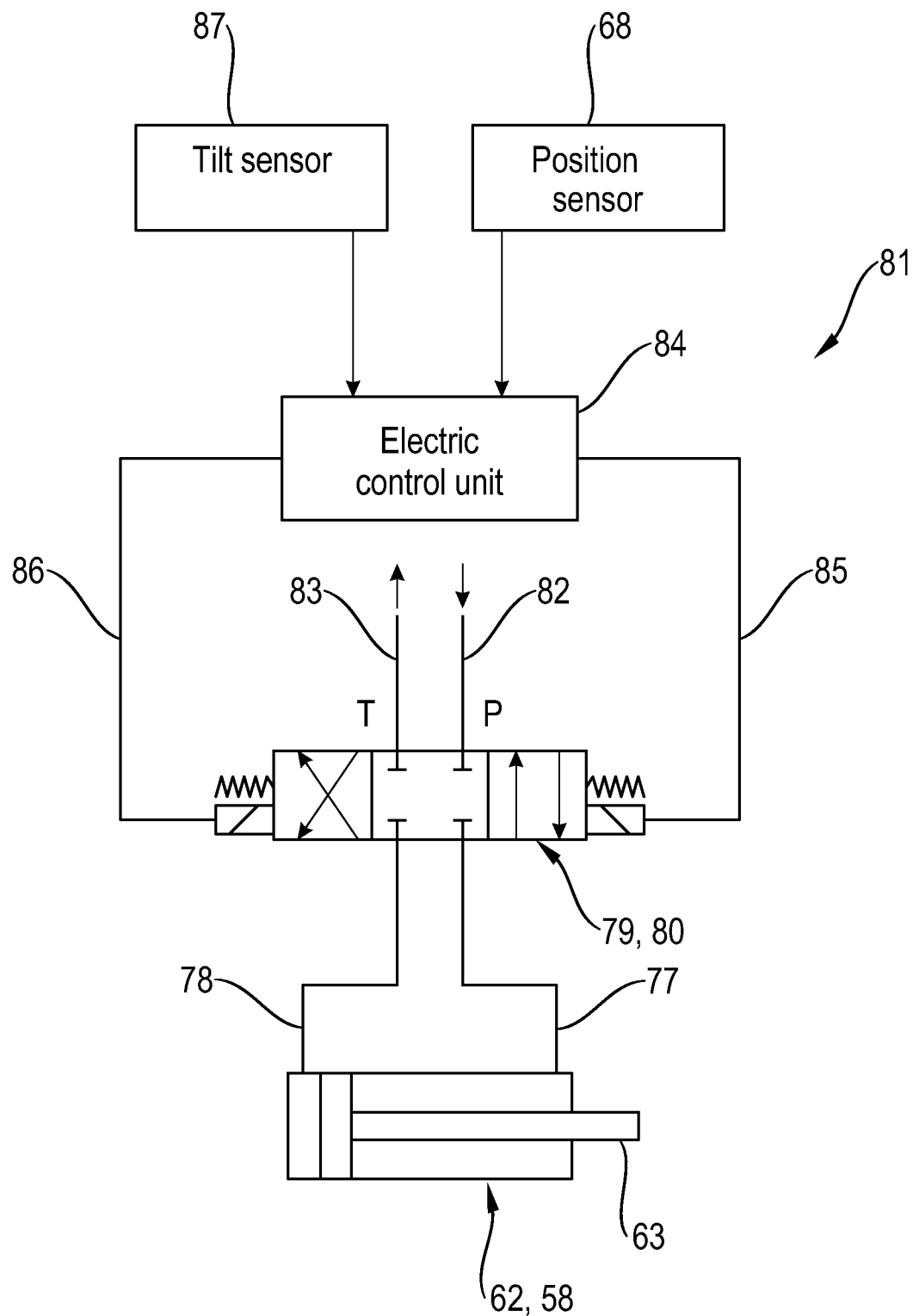
FIG. 4 shows a schematic diagram for the controlling of the piston-cylinder unit.

FIG. 4 shows a schematic diagram 81 for the controlling of the hydraulic piston-cylinder unit 62. The hydraulic piston-cylinder unit 62 can be impinged by pressure oil by means of a first hydraulic line 77 and a second hydraulic line 78. The first hydraulic line 77 and the second hydraulic line 78 are connected to a control valve 79 which is formed as a 4/3 directional valve 80 in the embodiment example. Further, the control valve 79 is impinged by pressure oil of existing hydraulics (not shown) in the combine harvester 1 by means of a pump line 82 and is connected to the tank of these hydraulics by a tank line 83. The control valve 79 is controlled by an electric control unit 84 via control lines 85, 86. In the embodiment example, the electric control unit 84 controls the control valve 79 depending on the measurement results of the position sensor 68 and of a tilt sensor 87. The tilt sensor 87 which is usually already present in the combine harvester 1 determines the lateral inclination of the combine harvester 1. Accordingly, the electric control unit 84 controls the switching positions of the control valve 79 in such a way that the piston rod 63 of the hydraulic piston-cylinder unit 62 is moved out, moved in or held in position. The invention is not limited to the measurement results of the tilt sensor 87 and position sensor 68 indicated in the embodiment example for controlling the control valve 79 but, rather, can be expanded by further criteria such as a pitching motion of the combine harvester 1, the quality of the harvested material or measurements of the throughput of the harvested material in the combine harvester 1.

Figure 5A:
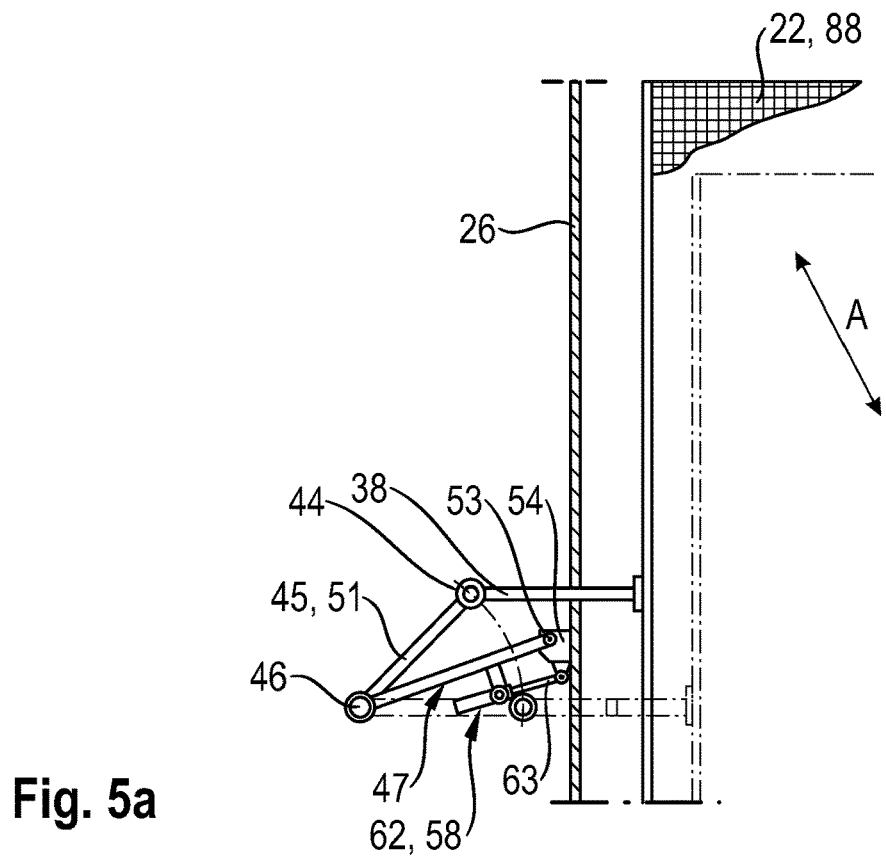
FIG. 5a shows a schematic view of the tilting mechanism with retracted piston-cylinder unit.
Figure 5B:
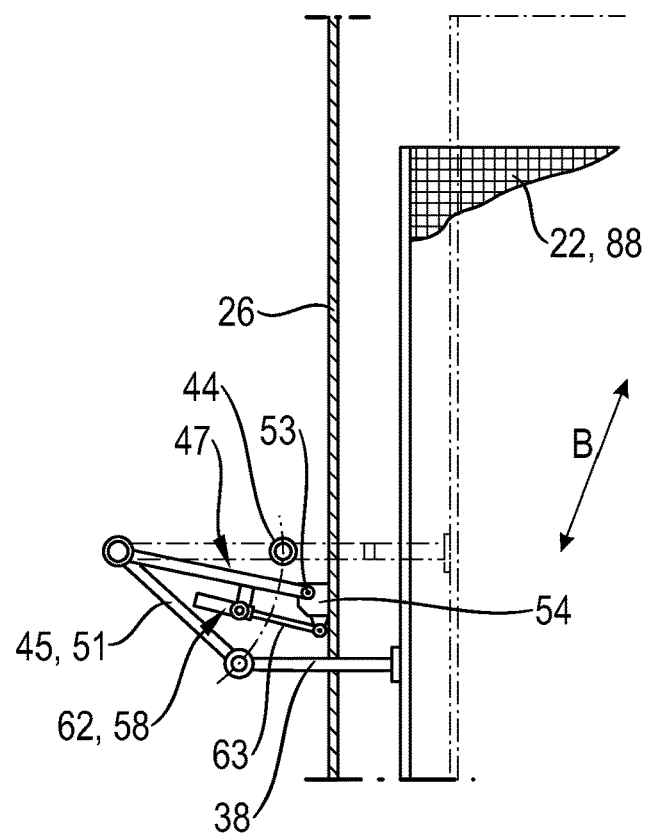
FIG. 5b shows a schematic view of the tilting mechanism with extended piston-cylinder unit.

The extension or retraction of the hydraulic piston-cylinder unit 62 changes the angular position of the swiveling fork 47 relative to the machine housing 26 around the swiveling axis 53 and, therefore, the magnitude of the lateral movement component of the top sieve 22, which corresponds to a change in the swiveling direction. A position of the tilting mechanism 47 with retracted piston rod 63 is shown schematically in FIG. 5a and a position of the tilting mechanism 47 with extended piston rod 63 is shown schematically in FIG. 5b. The swiveling movement of the top sieve 22 resulting from these two intermediate positions out of many possible intermediate positions is indicated by arrows A and B.

In an alternative embodiment, the hydraulic piston-cylinder unit 62 can be constructed as an electric adjusting device, for example, as an electric lifting cylinder. Further, a position measurement can be carried out at the actuator 58 as an alternative to detecting the position of the swiveling fork 47 by means of the position sensor 68.

REFERENCE CHARACTERS 1 combine harvester
2 driver's cab
3 grain tank
4 internal combustion engine
5 header
6 reel
7 feed conveyor
8 separating device
9 pre-acceleration drum
9a separating concave
10 threshing drum
10a separating concave
11 feed drum
11a separating concave
12 preparation floor
13 cleaning device
14 cleaning fan
15 transverse feed auger
16 device for residual grain separation
17 separating rotor
18 separating housing
19 return pan
20 feed conveyor
21 straw chopper
22 top sieve
23 bottom sieve
24 front swiveling element
25 rear swiveling element
26 machine housing
27 holder
28 bearing
29 first sieve pan
30 connecting rod
31 eccentric drive
32 second sieve pan
37 tilting mechanism
38 holder
39 longitudinal side
40 screw
41 bore holes
42 central region of the longitudinal side
43 first slot opening
44 first metal-rubber bearing
45 swiveling rod
46 second metal-rubber bearing
47 swiveling fork
48 first profile element
49 second profile element
50 narrowing side of the swiveling fork
51 component part
52 second position element
53 swiveling axis
54 holding device
55 supporting side
56 second slot opening
57 first position element
58 actuator
59 central region of the swiveling fork 60 U-shaped profile element
61 cylinder
62 piston-cylinder unit
63 piston rod
64 side facing the piston rod
65 axis
66 first element
67 rotational axis
68 position sensor
69 angular potentiometer
70 measurement gauge
71 pin
72 stop
73 surface
74 neutral position
75 object
76 straightedge
77 first hydraulic line
78 second hydraulic line
79 control valve
80 4/3 directional valve
81 schematic diagram
82 pump line
83 tank line
84 electric control unit
85 control line
86 control line
87 tilt sensor
88 conveying and cleaning unit
89 fastening element
FR driving direction
VR vertical direction

What is claimed is:

1. A self-propelled combine harvester comprising:
an oscillating conveying and cleaning unit,
at least one tilting mechanism configured for uniformly distributing a harvested material on the oscillating conveying and cleaning unit, wherein the tilting mechanism comprises:
  elements for defining a swiveling direction of the conveying and cleaning unit which are arranged between the conveying and cleaning unit and a machine housing, and
  an actuator configured for continuously adjusting at least one component part of the elements from an initial position to an adjusting position, wherein the position of the at least one component part decisively defines a swiveling direction, and
an electric control unit which is configured for directly or indirectly controlling the actuator depending on at least one state of the combine harvester and/or harvested material and at least an initial position of the at least one component part of the tilting mechanism.

2. The self-propelled combine harvester according to claim 1, wherein the initial position corresponds to an actual position of the at least one component part, and the adjusting position corresponds to a target position of the at least one component part, wherein the electric control unit is configured for determining the adjusting position and directly or indirectly controlling the actuator for moving the at least one component part into the adjusting position.

3. The self-propelled combine harvester according to claim 1, wherein the at least one state of the combine harvester and/or harvested material is a lateral inclination of the combine harvester.

4. The self-propelled combine harvester according to claim 1, wherein the conveying and cleaning unit is tiltably suspended in the machine housing by swiveling elements.

5. The self-propelled combine harvester according to claim 1, wherein the elements of the tilting mechanism comprise at least one holder, a swiveling rod, a swiveling fork and a holding device, wherein the at least one holder is arranged in a stationary manner at one end laterally at the conveying and cleaning unit and projects out through slots lateral to the machine housing, wherein the at least one holder is rotatably connected at a free end to one end of the swiveling rod, wherein the swiveling rod is rotatably arranged at the at least one component part which is the swiveling fork, wherein the swiveling fork is arranged at the machine housing by means of a holding device so as to be tiltable around a swiveling axis.

6. The self-propelled combine harvester according to claim 1, wherein the actuator is arranged at least approximately parallel to the at least one component part.

7. The self-propelled combine harvester according to claim 5, wherein the actuator is formed as piston-cylinder unit.

8. The self-propelled combine harvester according to claim 7, wherein the piston-cylinder unit comprises a cylinder and a piston rod, wherein the cylinder of the piston-cylinder unit is rotatably movably connected to the swiveling fork on a side facing the piston rod by means of a fastening element, wherein the piston rod of the piston-cylinder unit is rotatably movably connected to the holding device.

9. The self-propelled combine harvester according to claim 1, wherein a position sensor is arranged between the machine housing and the at least one component part in such a way that the position sensor acquires a measurement signal for determining a position of the at least one component part relative to the machine housing, particularly an angle between the machine housing and the at least one component part around a swiveling axis.

10. The self-propelled combine harvester according to claim 1, further comprising a tilt sensor that is configured to detect a lateral inclination of the combine harvester.

11. The self-propelled combine harvester according to claim 5, wherein the tilting mechanism has a neutral position, wherein at least a first position element is provided at the holding device, which first position element has a surface for defining a plane, wherein in a neutral position of the tilting mechanism the plane is tangent to a defined second position element which is arranged on the at least one component part.

12. The self-propelled combine harvester according to claim 1, wherein the tilting mechanism is formed in such a way that influence of the tilting mechanism on a swiveling direction of the conveying and cleaning unit is at a minimum in a neutral position of the tilting mechanism.

13. The self-propelled combine harvester according to claim 1, wherein the actuator is constructed as a hydraulic piston-cylinder unit, wherein the hydraulic piston-cylinder unit is impinged by pressure oil via a control valve, and wherein the electric control unit is configured to control the control valve.

14. The self-propelled combine harvester according to claim 13, wherein the hydraulic piston-cylinder unit forms a passage between a first hydraulic line and a second hydraulic line in at least one end position.

15. The self-propelled combine harvester according to claim 1, wherein the actuator is constructed as an electric lifting cylinder.

\* \* \* \* \*